May 31, 1960 A. CHRISTENSEN 2,938,360
ANHYDROUS AMMONIA STORAGE TANK
Filed Dec. 23, 1957
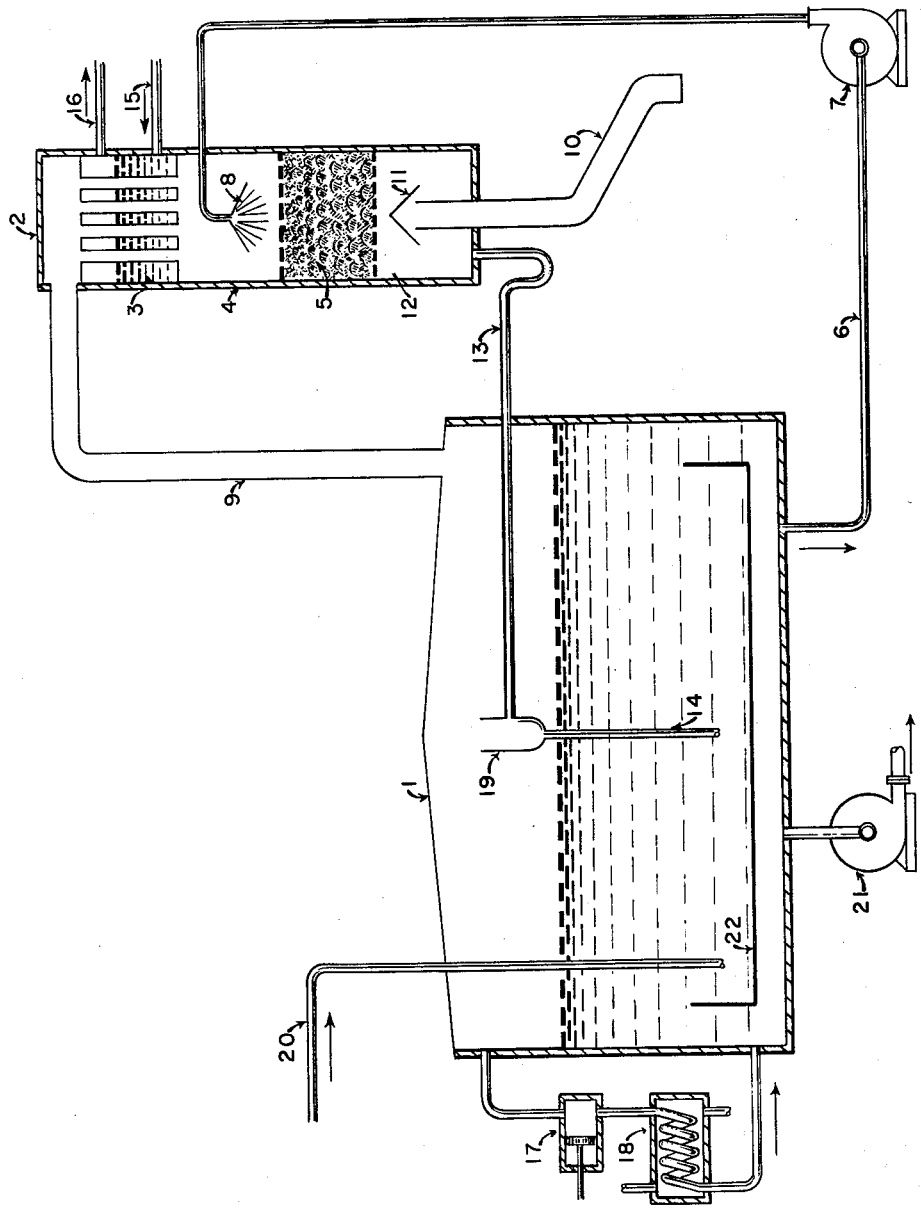
INVENTOR.
AXEL CHRISTENSEN
BY J.W. McCloskey
AGENT

United States Patent Office 2,938,360
Patented May 31, 1960

2,938,360

ANHYDROUS AMMONIA STORAGE TANK

Axel Christensen, Stamford, Conn., assignor to Chemical Construction Corporation, New York, N.Y., a corporation of Delaware Filed Dec. 23, 1957, Ser. No. 704,459

5 Claims. (Cl. 62—54)

This invention relates to an improvement in a method of and apparatus for storing low boiling point liquids and is particularly concerned with storage at atmospheric pressures of liquids which boil at temperatures below normal temperatures. More particularly this invention is concerned with the storage of liquid anhydrous ammonia at atmospheric pressures.

Ammonia is generally produced in large scale plants operating continuously throughout the year. Plants producing several hundred tons per day of anhydrous ammonia are common. Since the demand for ammonia is seasonal, it is, therefore, necessary to provide means for storage of large quantities of ammonia. This need for large storage capacity is complicated by the fact that under atmospheric pressures liquid ammonia boils at the exceedingly low temperature of about $-33°$ C. A further complicating factor in the storage of ammonia is that ammonia should not be mixed with air within the range of 16–25%, because such mixtures are explosive or inflammable. Precautions must also be taken in the storage of ammonia since ammonia is highly toxic to human beings. Hitherto the cost of safe storage equipment has been an item of major importance in the cost of ammonia to the ultimate consumer.

At the present time it is conventional practice to store small quantities of anhydrous ammonia in unrefrigerated pressure vessels and large quantities under pressure in refrigerated spheres. Very large quantities of ammonia have been stored as aqua in tanks under atmospheric pressure. This type of storage has been found advantageous where the soil can support the tanks without any special provisions. Recent studies have indicated that the most economical way to store large quantities of ammonia is in the form of anhydrous ammonia in atmospheric storage tanks. The main objection to the use of large storage tanks of this type has been the lack of absolute assurance that the pressure in the gas space of the tank can be maintained at atmospheric pressure. Although sensitive instruments are available to actuate equipment which will maintain normal pressures, no assurances can be had that these instruments will perform properly at all times. Since a slight deviation of the pressure within the storage tank, either above or below atmospheric pressure, will tend to cause a failure of the storage tank, generally the hazards involved have been considered too great to warrant installing this latter type of storage tank.

This invention in its broad aspects comprises a method of storing highly volatile liquids at their liquefaction temperatures. It also comprises means by which this storage is accomplished. As in conventional refrigeration practice a portion of the gases which overlies the body of liquid being kept at a temperature below normal temperatures is withdrawn from the upper space of the storage tank, compressed, liquefied by cooling and returned to the liquid layer in the storage tank. By this means the heat transferred through walls of the storage tank is removed, thereby preventing an undue amount of vaporization of the stored liquid. At the same time heat is being extracted, the pressure of the gas above the stored liquid may be either equal to atmospheric pressure, higher than or lower than atmospheric pressure. If the pressure within the tank is equal to that of the atmosphere, there would be no need for a device such as is the subject of this invention. Generally, the pressure within the tank is above or below atmospheric pressure due to the constant change of atmospheric conditions and inconstant amounts of gas being withdrawn from the storage tank and pumped to the refrigeration unit. By the means of the present invention the pressure of the overlaying gas within the storage tanks is, by the simple means described below, maintained at a pressure which is practically equal to that of the atmospheric pressure outside the storage tank, thereby preventing disrupting effect of expanding gases within the storage tank or the collapsing pressure of the external atmosphere. The means for accomplishing this equalization of pressure is a condenser combined with a saturator, both of which are interconnected and also connected by pipelines with the storage tank.

When the pressure of the gas within the tank is higher than that of normal pressure, the gas flows through a pipeline into a condensing section which causes the condensible material to liquefy and drain from the condenser to the saturating section. The remaining uncondensible gas leaving the condenser flows through the saturator where it comes in contact with liquid from the storage tank which is sprayed into the saturator. The sprayed liquid and condensate thereafter flow back into the storage tank. Simultaneously, the excess gas thus cooled and scrubbed is vented to the atmosphere.

In the event the pressure within the storage tank is less than atmospheric pressure, air is drawn through a vent into the saturator where it is contacted with liquid pumped from the storage tank and sprayed into the saturator. A part of the liquid evaporates and the vapor mixes with the air. Thereafter the gases pass upwardly through the condenser and through a vent pipe into the gaseous section of the storage tank to equalize the pressure of the gas within the storage tank and that of the outer atmosphere.

The system referred to above being sensitive to slight changes in pressure quickly responds to variations in pressure within and without the storage tank.

It is an object of this invention to provide for the storage of liquids, particularly anhydrous ammonia, which boil at temperatures below normal temperatures at atmospheric pressure. A further object of the invention is to equalize the pressure of the gases above the liquid in the storage tank with the outside atmosphere. It is still a further object of this invention to store low-boiling point liquids under atmospheric conditions wherein a minimum of controls is necessary. Other objects and advantages will appear in the following description of the specific embodiments of the invention.

The single figure is a diagrammatical representation of a storage tank having appurtenant thereto a tower comprising a condensing section superimposed on a saturating section, a cooling section and necessary piping, pumps and compressors for circulating liquids and gases.

Referring now to the drawing, numeral 1 designates a conventional vertical cylindrical tank which is usually of the type found satisfactory for storing gasoline and like liquids. All that is required of the tank is that it be placed on a suitable foundation to support the weight of the liquid plus the tank and that the tank be of sufficient strength to contain the liquids stored therein. Insulation may be provided to partially eliminate transfer of heat from the surroundings to the liquids within the tank. However, insulation is not essential since the heat that enters the stored liquid may be extracted from the system by removal of gases from the storage tank, compression of said gases, followed by cooling to liquefy the gas and returning the liquid to storage. The tank 1 is partially filled with a low-boiling point liquid with a vapor space for the liquid which is preferably 15% to 20% of the total space within the tank. Connected to the tank 1 by suitable conduits and piping is the tower 2 which consists of a condensing section 3, a space 4 wherein a liquid pumped from the storage tank can be sprayed over the packing section 5, and collecting space 12 with a drain 13 and a conduit 10 open to the atmosphere. A baffle 11 is placed over the pipe 10 to prevent liquid from entering said pipe. In the condensing section 3 there is provided means 15 for pumping in a low-boiling point liquid which acts to cool and condense out condensibles in the section 3. Vaporized coolant leaves the condenser through pipe 16. Liquid from the storage tank 1 flows through line 6 to the pump 7, which pumps it to the spray 8 where it is sprayed over packing 5.

Although the tank is generally heavily insulated, some means must be provided to remove the heat from the surroundings which is transmitted through the walls of the storage tank. This is accomplished by withdrawing some of the gas from the vapor space in tank 1 to a compressor 17 which compresses the gas. Heat is extracted by cooling coils within tank 18 to liquefy the compressed ammonia gas. Non-condensible gases compressed together with the ammonia is separated from the liquefied ammonia and vented through a conventional purging device well recognized in the art before the liquid ammonia is pumped back to the storage tank. Thereafter the liquefied gas is returned to the storage tank. This section operates to the extent that the heat which enters through the walls of tank 1 will be removed by cooling of the compressed gas in tank 18.

The product liquid being delivered to the tank through pipe 20 which extends down through the tank close to the bottom of said tank, is directed into evaporator pan 22 in order to prevent undue stresses being set up in the bottom plate of the tank 1 by localized cooling caused by evaporation of liquid during initial filling. The product from the tank 1 is pumped by pump 21 either to tank cars or to processes which require the liquid.

The liquid which collects in the bottom of tower 2 flows through pipeline 13 back into the storage tank 1 to a liquid-gas separator 19—gas being liberated to the vapor space of the storage tank while liquid portion flows down into the body of the stored liquor through line 14.

The apparatus is particularly suited for the storage of ammonia which has a boiling point of about −33° C. The liquid anhydrous ammonia generally produced at a nearby ammonia plant and preferably substantially free from dissolved gases and cooled to a temperature commensurate with economy in refrigeration, flows through the line 20 to the storage tank where it can be kept nearly full or at varying amounts, as is practical. The heat content of the ammonia entering through line 20 and the external heat flowing through the walls of the storage tank causes some of the liquid ammonia to vaporize and fill the upper portion of said tank. In order to overcome this heat inflow a certain portion of the ammonia is withdrawn, compressed and liquefied by cooling.

The pressure of the ammonia within the vapor section of the tank may exist in two conditions which may cause the tank wall to fail by excessive pressures. If too much ammonia vaporizes within the tank and no outlet is provided then the tank may disrupt and liberate valuable ammonia and also cause a hazardous condition by liberation of toxic chemical. In the event the gas in the vapor space is withdrawn at too great a rate the pressure in the tank may become less than atmospheric, whereupon the outside pressure will cause the tank to collapse, also causing a loss of ammonia and danger to personnel in the area.

By the operation of this invention when the pressure within the gas space of tank 1 becomes greater than atmospheric, the excess gas flows upwardly through the vent 9 and into tower 2 and condenser 3, where it comes into heat exchange relationship with a cold ammonia delivered to the condensing section by a pipe 15. The ammonia which is condensed falls through the tubes in the condenser to the packing section 5 where it joins the continuous flow of liquid ammonia being pumped from the storage tank through line 6 into section 4. The condensate and sprayed liquid flows through the packing 5 down to the bottom section 12 where the liquid collects and flows back into the tank through the line 13. Should inerts be mixed with the ammonia gas entering tower 2 through line 9, a small amount of ammonia vapor may escape with the inerts through pipe 10 until the compressor is adjusted to remove the volume causing pressure in excess of atmospheric in tank 1. With proper operation this loss will be negligible.

In the event the pressure in the gas space in the storage tank becomes less than atmospheric an opposite condition is established in which air flows through the vent 10 up through the packing in section 5, countercurrent to the liquid ammonia which is continuously flowing downwardly through said packing. The air thus saturated with ammonia flows upwardly into the condensing section where some of the ammonia is condensed out and returned to the lower packing section. The air containing ammonia vapor in excess of 25% then flows from the tower 2 through vent 9 into the vapor space in the storage tank. If air was permitted to flow directly into the upper gaseous space in the storage tank there is danger that a mixture of air and ammonia would reach that composition which is explosive. However, in the present instance, the ammonia in the mixture will always be in excess of that amount which, when mixed with air, will cause explosion.

From the above it is seen that the device for maintaining the pressure in the storage tank is entirely independent of the functioning of the recompression unit provided for maintaining the temperature of the liquid in the storage tank and of the pump-out pump provided for delivery of product from the storage tank. The only moving equipment involved is the pump 7 delivering liquid ammonia to the saturation section, but should this pump fail, then both the compressor 17 and the pump-out pump 21 will shut down because of a conventional electrical cross-interlock between the motors. Consequently, there will be no means for producing a vacuum in the gas space of the storage tank. Under this condition, gas will evolve from the liquid due to the heat inflow to the tank and this gas will be condensed and returned to the tank. Should, for any reason, the refrigeration on the condenser fail, then that would mean that the ammonia evaporated would escape to atmosphere and, if this is too much of a nuisance, it could be passed through vent 10 to a scrubbing tower and be made into aqua ammonia or treated with an acid to produce ammonium salt solutions.

It will be noted that should ammonia gas escape in this fashion, then the temperature in the vent pipe to atmosphere will decrease and will reach a temperature substantially lower than ambient. On the other hand, when air is entering through the intake pipe, the temperature in the pipe will gradually approach ambient if the air flow is kept up for any considerable length of time. This variation in temperature can be used to actuate the instruments on the recompression compressor in such a way that this unit operates at maximum capacity when the temperature in the pipe is low and shuts off when the temperature approaches ambient.

It should be understood that the invention in its broader aspects is not restricted to the specific details which have been described and shown, but that it is limited only by the following claims.

What is claimed is:

1. In apparatus for storage at atmospheric pressures of liquids having boiling points below normal atmospheric temperatures which comprises a storage tank having a product inlet and product outlet, means to maintain liquid in the storage tank at the boiling point temperature of said liquid stored therein, and in combination therewith a condensing tower, a saturating tower communicatively connected to said condensing tower, a gas vent pipe from the storage tank to the top of the condensing tower, a gaseous vent pipe to the atmosphere extending through the bottom of the saturating tower into the lower portion of said tower, a return pipeline from the bottom of the saturating tower to the storage tank, and means to transport scrubbing liquid from the storage tank to the top of the saturating tower.

2. The apparatus as in claim 1 in which the condensing tower is superimposed on and communicatively connected to the saturating tower.

3. In the apparatus as set forth in claim 1 in which the liquid being stored is liquid ammonia.

4. A method of storing at atmospheric pressures a liquid having a boiling point below atmospheric temperatures, the improvement which comprises establishing a body of said liquid in a storage tank, providing a gas space above the liquid level, removing part of the gas from said space, compressing the gas, liquefying said gas and returning it to the liquid section, simultaneously equalizing the pressure in the gas space with the atmosphere by an interconnected condenser and saturator, allowing the gas within said space to flow to the condenser and saturator when the pressure in said space is greater than atmospheric pressure and allowing air to flow to the saturator and condenser when the pressure in said space is less than atmospheric pressure, spraying liquid from the storage tank into the saturator, collecting the sprayed liquid and returning said liquid to the storage tank.

5. The method as set forth in claim 4 in which the liquid being stored is liquid ammonia.

References Cited in the file of this patent

UNITED STATES PATENTS 2,059,942     Gibson _____ Nov. 3, 1936